United States Patent [19]
Pierce

[11] Patent Number: 4,783,660
[45] Date of Patent: Nov. 8, 1988

[54] SIGNAL SOURCE DISTORTION COMPENSATOR

[75] Inventor: John N. Pierce, Lexington, Mass.
[73] Assignee: Signatron, Inc., Lexington, Mass.
[21] Appl. No.: 913,072
[22] Filed: Sep. 29, 1986
[51] Int. Cl.[4] .............................................. G01S 7/30
[52] U.S. Cl. ................................. 342/101; 342/160; 342/194; 342/195; 367/45; 364/724.12; 455/63
[58] Field of Search ............... 342/194, 195, 202, 203, 342/93, 159, 160, 162, 173, 174, 199–201, 82, 89, 101; 367/43–44, 45; 364/724; 455/50, 63, 75, 276

[56] References Cited

U.S. PATENT DOCUMENTS

| | | | |
|---|---|---|---|
| 3,778,822 | 12/1973 | Bauer | 342/93 |
| 3,855,423 | 12/1974 | Brendzel et al. | 364/724 |
| 3,889,108 | 6/1975 | Cantrell | 364/724 |
| 3,946,382 | 3/1976 | Kossiakoff et al. | 342/93 |
| 4,011,438 | 3/1977 | Aufderheide et al. | 364/724 |
| 4,031,364 | 6/1977 | Wilmot | 364/724 X |
| 4,040,055 | 8/1977 | Donahue et al. | 342/162 |
| 4,173,017 | 10/1979 | Burlage et al. | 342/194 X |
| 4,188,667 | 2/1980 | Graupe et al. | 364/724 |
| 4,377,793 | 3/1983 | Horna | 364/724 X |
| 4,484,194 | 11/1984 | Arvidsson | 342/174 |
| 4,626,856 | 12/1986 | Pierson et al. | 342/174 |
| 4,694,298 | 9/1987 | Milan | 342/89 |
| 4,709,236 | 11/1987 | Taylor, Jr. | 342/101 |

Primary Examiner—Theodore M. Blum
Assistant Examiner—Bernarr Earl Gregory
Attorney, Agent, or Firm—Robert F. O'Connell

[57] ABSTRACT

A signal processing system in a transmitter/receiver system for reducing undesired amplitude, frequency and/or phase distortions arising due to variations from transmitter pulse to transmitter pulse. A plurality of sequential samples of transmitted pulses are averaged and a plurality of filter coefficients are determined therefrom. The coefficients are used in a plurality of filters which respond to a plurality of sequential samples of received pulses, the filters providing output signals in which such distortions are reduced.

21 Claims, 5 Drawing Sheets

SIGNAL SOURCE DISTORTION COMPENSATOR

INTRODUCTION

This invention relates generally to signal processing techniques for removing or reducing the effects of instabilities in pulsed signal sources, as in pulse echo systems using a pulsed signal transmitter source, and, more particularly, to a technique for compensating for the varying amplitude, frequency and/or phase characteristics of the signal source pulses during operation by preprocessing each received signal pulse so as to make it appear that it was transmitted by a single signal source which had time-invariant amplitude, frequency and/or phase characteristics.

TECHNICAL FIELD

The technical field of the invention is generally the field of pulsed echo systems, the invention being particularly of significant used in the field of radar or sonar systems, particularly including, for example, radar systems which incorporate clutter cancellation, Doppler estimation and moving target indicator (MTI) techniques, regardless of the type of transmitting source which may be used therein.

BACKGROUND OF THE INVENTION

In pulsed return echo transmit/receiver systems, such as radar or sonar systems, for example, the pulsed signals from a transmitter pulsed signal source may vary in their amplitude, frequency and/or phase characteristics from pulse to pulse so that the received target echo pulses are to some degree dissimilar, that is, they contain distortions which arise as a result. It is desirable to reduce the effects of such distortions as much as possible.

An example of a system in which such distortions are undesirable is a radar system which is used to develop transmitter pulse signals requiring the utilization of a high power pulsed signal source, such as a magnetron, for example. Magnetrons are relatively inexpensive and have a long life and tend to be very reliable in such a context and so their use is highly desired in many applications. However, unlike coherent power sources, such as klystrons, magnetrons can generate relatively severe amplitude, frequency and/or phase distortions.

In many such radars, however, a further problem which arises in the signal processing of the incoming target return, or echo pulse, signals in the radar receiver, is that such return pulses are often accompanied by ground clutter; i.e., returned echo pulses from fixed targets on the ground which tend to mask or otherwise obscure the returned pulses from the desired moving target which may be at the same range. One technique for removing, or at least substantially reducing, the effects of ground clutter is to utilize Doppler processing or Doppler filtering techniques, radars using such techniques being known in the art as Doppler filter or moving target indicator (MTI) radars. For such a Doppler processor radar system to operate effectively, however, the high powered transmission pulses must be substantially identical to one another and any deviations or distortions in the pulse amplitude, frequency or phase characteristics thereof tend to prevent the Doppler system from effectively reducing the ground clutter effects so that the system becomes less useful.

Magnetrons, however, tend to produce pulses whose characteristics are not exactly the same from pulse to pulse. In many cases the differences are sufficient that their amplitude, frequency and/or phase variations introduce problems in processing the return echos. Such magnetrons are in effect pulsed oscillators, the phase of the output pulse is substantially completely random on a pulse to pulse basis and, in addition, there may also be small amplitude and frequency modulation effects which are introduced from one pulse to another.

One technique for compensating for phase variations in such radar systems is to use a coherent oscillator circuit, sometimes referred to as a "coho circuit", a technique that has been long used in MTI radars. While variations from pulse to pulse of the average phase can be relatively effectively compensated by the use of such circuits, the remaining amplitude modulation (AM) and frequency modulation (FM) effects often still limit the system's performance. Normally, it has been found that the FM effect is the most difficult to compensate for and is often the more critical of the two modulation effects. One approach to avoiding the problem of AM and FM distortions has been to design relatively expensive magnetron structures having very low AM and FM distortions. Such designs are very difficult to implement and tend to measurably increase the cost of the power tubes and the transmitter portion of the system, particularly when an overall radar system has already been installed, is in use, and must be retrofitted with such newly designed magnetrons. It would be more desirable to avoid such costly redesign and to devise receiving techniques which use appropriate circuitry for compensating for such AM and FM effects. This is particularly so if such circuitry can be used in existing systems to retrofit such systems in such a way as to improve their performances at a reasonable cost.

Another proposed technique includes the use of a transversal equalizer circuit in which a received, or return echo, signal in its complex form, i.e., a form having both in phase and quadrature components, is sampled in time. The digitized samples are then compared with the transmitted pulse, also in its complex form. The circuit recognizes changes in the structure of the transmitted pulses, on a pulse to pulse basis, and compensates for amplitude, frequency and phase changes. After compensation, the waveforms of the received pulses approach those which would have been received if the transmitter had time-invariant amplitude and phase characteristics. More specifically, such circuitry includes a tapped delay line to which received signal samples are supplied, the delayed output from each of the taps being weighted in accordance with a suitable weight generator circuit and the weighted signals being appropriately summed to supply an output supply to the receiver. The weights as determined by the weight generator circuit are discretely changed from transmitted pulse to transmitted pulse in accordance with suitable selected criteria so that the output to the receiver is appropriately compensated for with respect to amplitude, frequency and/or phase variations in the transmitted pulse signals prior to the supplying of the corresponding received echo signals to the receiver circuitry.

While the latter technique achieves a reasonable degree of effectiveness in some applications, such compensation approach does not provide a sufficient improvement in the received signal for many other applications and it is desirable to devise an even better way of compensating for such distortion effects.

BRIEF SUMMARY OF THE INVENTION

In accordance with the invention, a selected number of samples of the digitized complex components of each of a plurality of transmitter signals are averaged and a plurality of filter coefficients (weights) for the selected number of samples for each transmitted signal are determined. The digitized complex components of a plurality of received signals are supplied to a filter, the coefficients of which are those so determined from the transmitter signal samples. The output of the filter is supplied to conventional Doppler or MTI processing circuitry.

The use of such averaging technique for providing the desired filter coefficients, or weights, provides much greater reductions of the effects of transmitter signal distortions than with any previously known techniques. Moreover, even further improvement can be obtained through the use of additional, in some cases optional, processing of the received signal prior to the processing by the equalizer circuitry of the invention.

DESCRIPTION OF THE INVENTION

The invention can be described in more detail with the help of the accompanying drawings wherein.

Figure 1:
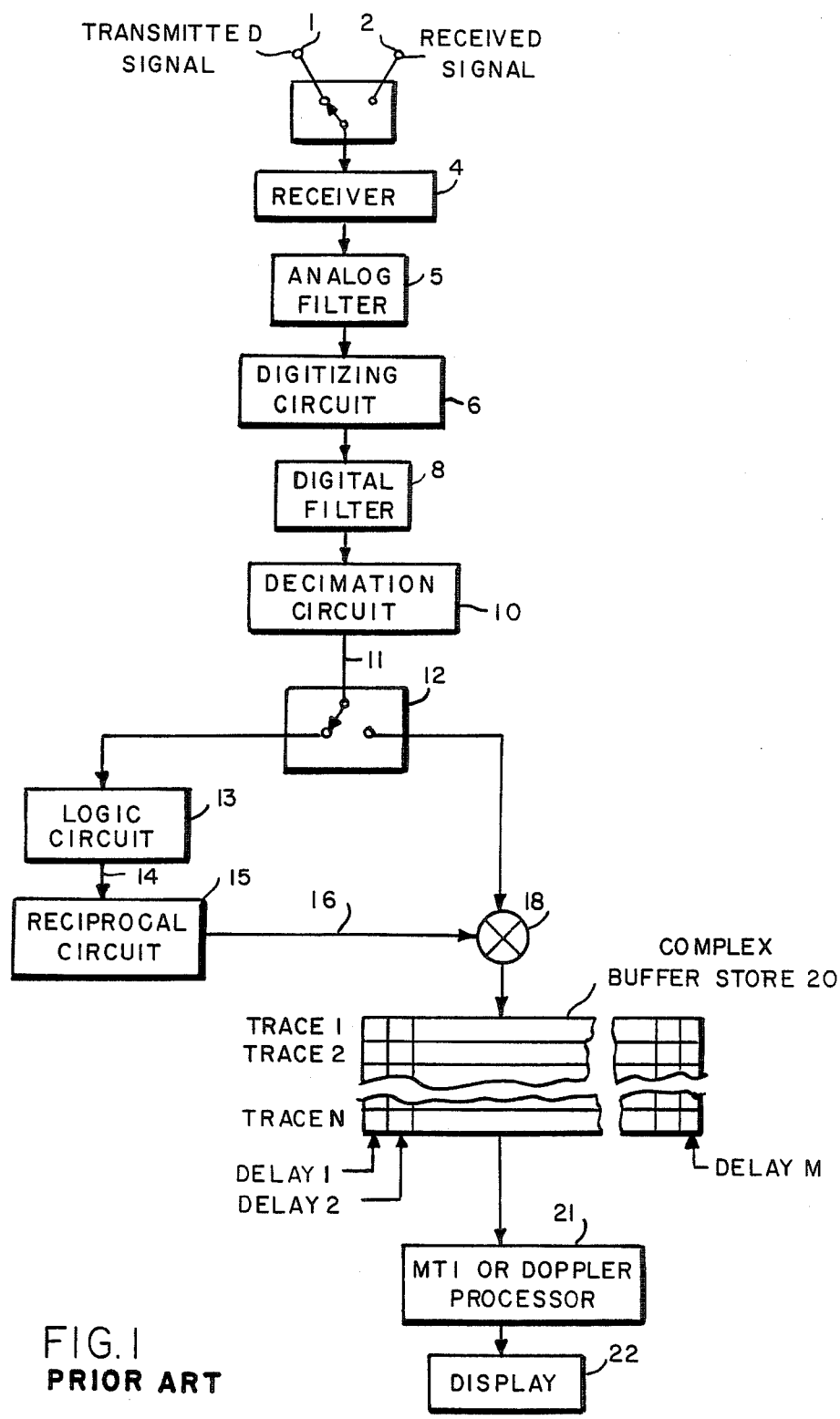
FIG. 1 shows a block diagram of a receiver system of a known type as used for digitized moving target indicator (MTI) or Doppler analysis radar processes.

It is helpful in understanding the invention to review a conventional digitized moving target indicator (MTI) or Doppler analysis radar processor as shown in FIG. 1. A receiver 4 is connected to attenuated replicas of the transmitted signal 1 by means of a switch 3. After completion of the transmitter pulse the receiver is connected to received signals 2 obtained from a receiving antenna (not shown). The signals from receiver 4 are supplied to an analog filter circuit 5 and a digitizing circuit 6 derives digital samples of the complex envelopes of the transmitted and received signals.

The digitized complex signals 7 at the output of digitizing circuit 6 are supplied to a suitable digital filter circuit 8 so as to reduce the effective bandwidth thereof. In addition the reduced bandwidth signal 9 may be supplied to a circuit for reducing the sample rate thereof by some appropriate amount via a decimation circuit 10, as would be well-known to the art.

The resulting complex signal samples 11 of the transmitted pulse are supplied via switch 12 to logic circuit 13 which is used to find the complex value of the pulse center and thence to reciprocal circuit 15 which obtains the reciprocal of the complex value of the pulse center to provide a scaling multiplier at 16 which is supplied to the input of a multiplier circuit 18.

During the reception of the returned echo signals (i.e., returned received signals) multiplier 18 multiplies the received signal samples supplied thereto via switch 12 to correct or adjust the received signal samples for the average phase and amplitude of the transmitted pulse. The adjusted received data at the output of multiplier 18 from N consecutive return radar pulses are stored in a complex buffer store 20 which stores M consecutive samples for each of the N traces. The value of N is typically 2 or 3 for simple moving target processing but may be much larger for Doppler analysis processing. The corrected data stored in buffer 20 is processed by suitable MTI or Doppler analysis processing hardware 21 and the processed received signal is then displayed on a display monitor 22 or otherwise used by the radar system.

Figure 2:
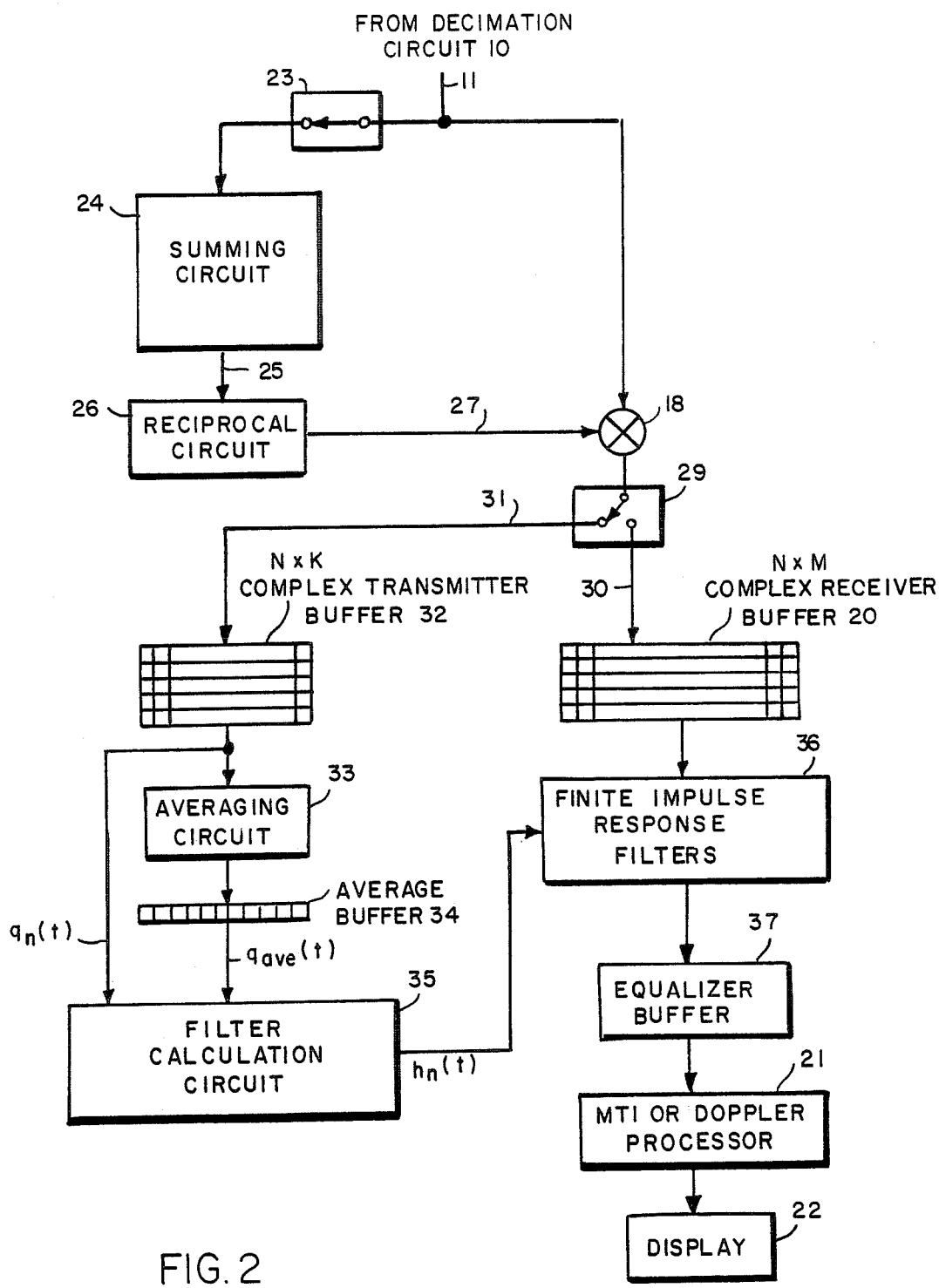
FIG. 2 shows a block diagram of a portion of a receiver of the type shown in FIG. 1 as modified in accordance with the invention.

Such a conventional MTI processing approach as shown in FIG. 1 would be well known to those in the art and each of the circuits for performing the desired operations throughout the process are circuits which are available and have long been used by those in the art for such purpose. Such a system, however, is subject to performance degradations arising from small variations of the radar pulse shape, pulse width, internal phase variations, frequency jitter characteristics, and the like. In order to overcome such performance degradations a system in accordance with the invention as shown in FIG. 2 can be used.

Such a system is intended to reduce the disparities among the pulses which are received by the moving target processor and, thus, decrease the degradations as suffered by the previous conventional system. In FIG. 2 only a portion of the overall processing circuitry is shown since such a system can utilize the same decimated complex signal samples 11 which were supplied to switch 12 in FIG. 1. In FIG. 2 during the transmit mode a switch 23 routes K consecutive finely spaced samples of the transmitted pulse to a summing device 24. Such device is used to form the complex sum of all the transmitter samples from the signal transmitter pulse trace. The resultant complex sum 25 is reciprocated in reciprocal circuit 26 so as to produce a complex scale factor at the output 27 thereof which is supplied to a multiplier 18 which is substantially the same as the multiplier used in the conventional digitized MTI receiver of FIG. 1.

The scale factor is used to multiply all samples both of the transmitter pulse signals and the receiver pulse signals, the latter being directly supplied to multiplier 18 from decimation circuit 10.

A switch 29 is then used to assign signal samples to either an $N \times M$ multi-trace complex receiver buffer 20 or to a $N+K$ complex transmitter buffer 32. Receiver buffer 20 stores N traces having M samples per trace of the received signal while transmitter buffer 32 stroes N traces having K signal samples per trace. After storage of the transmit data from N pulses, an averaging circuit 33 is used to average the individual transmitter pulse sequences so as to store the average pulse sequence in an average buffer 34. A filter coefficient calculation circuit 35 is then used to compute a separate filter coefficient for each pulse repetition interval (PRI) by deriving a plurality of filter coefficients $h_n(t)$, each filter coefficient being equal to twice the kth sample of the average pulse, $q_{ave}(t)$, less the kth samples of the pulse from the nth pulse repetition interval, $q_n(t)$, as discussed more fully in Appendix A, attached hereto, and made a part hereof.

The filter coefficients $h_n(t)$ are used as the coefficients for a plurality of finite-impulse response filters 36 which filters respond to the stored data from receiver buffer 20 and act as a set of equalizers to produce equalized data output therefrom to be stored in a buffer 37 which contains M+K samples from each of the N pulse repetition intervals. The stored data from buffer 37 is then processed in a conventional manner by MTI or Doppler processor 21 (in the same manner as in the conventional system shown in FIG. 1) and displayed or otherwise used as disclosed in the conventional system.

The circuitry shown in FIG. 2 with the exception of the display unit 22 can all be performed using an appropriate data processing system (i.e., a digital computer system) having suitable memory for providing the buffer operations and suitable for performing the various processing operations depicted therein. Such processing is suitably performed, for example, by appropriately programming such a data processing system in accordance with the equations representing each of the steps discussed with respect to the block diagram of FIG. 2. Such equations are discussed in detail in the aforementioned Appendix A, the information therein being sufficient for those skilled in the art to permit them to provide the necessary processing, as discussed therein, by utilizing any appropriate generalized digital computer system available in the art.

By using the averaging process for calculating the filter coefficients in the circuitry of FIG. 2 of the invention, it is found that significant improvement over prior techniques is achieved. Thus, in a conventional receiver, such as shown in FIG. 1, wherein stationary clutter return contaminates the processing and, wherein pulse-to-pulse variations in the transmitter pulses may only represent 2% of the average pulse shape, the resulting leakthrough of stationary clutter return is relatively high. Such leakage can be reduced by as much as 35 dB below the peak signal when using a system, for example, such as that shown in the above-mentioned Mahoney application. However, using the circuitry of FIG. 2 the resulting leakage can be reduced to an order of 50 dB or more below the peak signal.

When such reductions in leakage occur, it may be desirable to effect even further improvements in the original receiver processing prior to processing the received complex samples 11 from decimation circuit 10. Such further improvements become more significant when using the improvement of the invention because in prior used systems any improvements in the preequalization processing would tend not to provide any more effective operation since such improvements would be, in effect, "masked" by the inability of the prior systems to achieve the more effective results obtainable by the invention.

Figure 3:
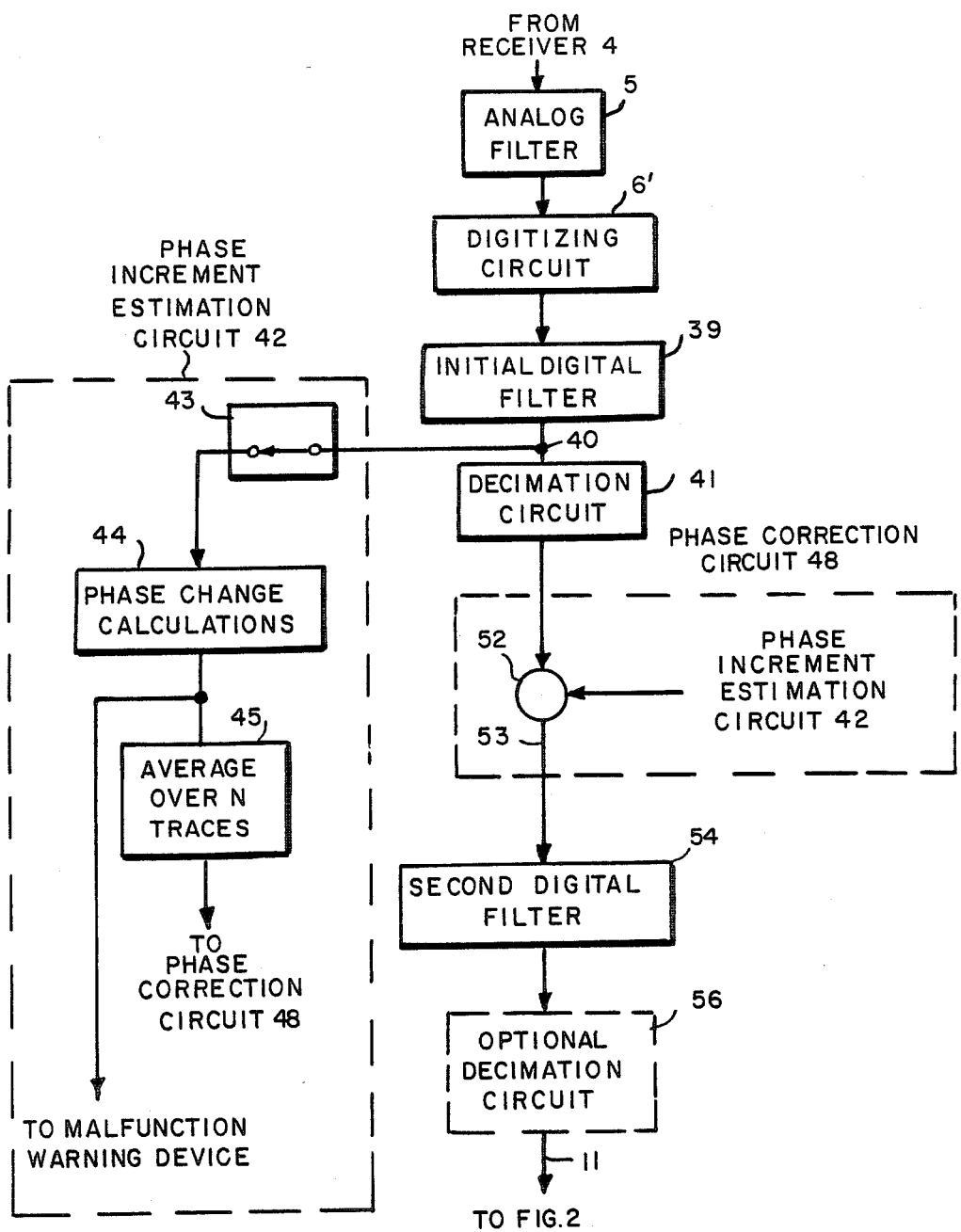
FIG. 3 shows a block diagram of another portion of a receiver system of the type shown in FIG. 1 as modified in accordance with the invention.

One such specific further improvement is to use a higher sampling rate in the digitizer circuit 6 and to utilize a digital filter circuit 6' (FIG. 3) which provides much better anti-aliasing characteristics, as shown in FIG. 3, in which the sampling rate of the digitizing circuitry 6' is made substantially higher, e.g., at least two to four times, that used in a conventional digitizing circuit 6 as in FIG. 1. In combination therewith the initial digital filter 39 shown in FIG. 3 is a low-pass filter which uses improved stop band rejection characteristics, e.g., typically providing more than about 40 dB stopband attenuation characteristics, so as to provide for better anti-aliasing (the general concept of aliasing effects and techniques for reducing such effects (anti-aliasing) are generally known to the art). The decimation circuit 41 then decreases the sample rate to the desired detection sample rate, as discussed above with reference to decimation circuit 10 of FIG. 1.

Further, an optional phase increment estimation circuit 42 can be utilized in order to track slow drifts of the signal source frequency. In such mode of operation (switch 43 is closed) inter-sample phase changes are calculated in circuit 44, such phase changes being averaged over a block of n transmitted pulse signals in an averaging circuit 45 in order to estimate the average sample-to-sample phase increments of such n transmitted pulses. The average phase increment for such block is supplied to phase correction circuit 48 to multiply the output from decimation circuit 41 at multiplier 52 for the next successive block of n transmitted pulses or n returned pulses. The phase correction circuit corrects the average phase increment of the next successive block of n transmitted pulses or of n returned pulses, respectively. Such phase correction process is repeated for each block of pulses, the average error of each block being applied to each subsequent block of pulses at multiplier 52.

In addition, the occurence of individual pulses with excessive frequency error (i.e., extremely high phase changes per signal sample), which errors are so great that they cannot be properly equalized by the circuitry of FIG. 2, can also be detected at circuit 44 and used to trigger a malfunction warning device (or to inhibit the display of the information on the display 22) to inform the user of the excessive error which has occurred.

The frequency corrected signal from multiplier 52 is supplied to a second digital filter 54 which has a very large stopband attenuation (again, for example, typically 40 to 50 dB rejection) from approximately 0.75 of the reciprocal of the radar tramsmitter pulse length T up to one-half of the incoming sampling rate, and having a pass band from 0 up to only approximately half of the reciprocal radar return pulse length. The output sample rate of the filter 54 can be even further decimated in a further optional decimation circuit 56, if desired, to produce a sampling rate of at least 1.5/T.

In order to achieve even further improvement of the overall equalization process shown in FIG. 2, it is possible to cascade such process and to perform the process successively in more than one operation. Such a technique is shown in broad block diagram form in FIG. 4 wherein a first stage 55 of a pair of cascaded stages receives the transmitted and received pulse signals at transmit buffer 56 and receiver buffer 58, respectively, effectively corresponding to the buffers 32 and 20 of the system of FIG. 2. Filter coefficient calculations are made in circuitry 57 in the manner discussed with reference to the corresponding circuitry of FIG. 2 and supplied to equalizer filter and buffer circuitry 59 (effectively corresponding to filter 36 and buffer 37 of FIG. 2) to produce returned output signal samples at the output of stage 55. In the first stage the transmitted pulse signals are also filtered using the filter coefficients in the same manner as the returned pulse signals to provide filtered transmitted pulse signals at the output of stage 55.

The signal samples of the returned output pulse signals and the filtered transmitted pulse signals from stage 55 are again processed in the same manner in second stage 60 using equalizer transmit and receiver buffers 61 and 63, respectively, and performing suitable filter coefficient calculations in circuit 62 for supply to equalizer filter and buffer circuit 64. The output returned pulse signals from stage 60 then represents a doubly equalized receiver signal having even greater reduction of the distortions therein which can then be supplied to appropriate MTI or Doppler processor circuitry as before. Depending upon the desired improvement and costs involved in a particular application, even additional cascaded stages can be utilized in the manner shown in FIG. 4.

Figure 5:
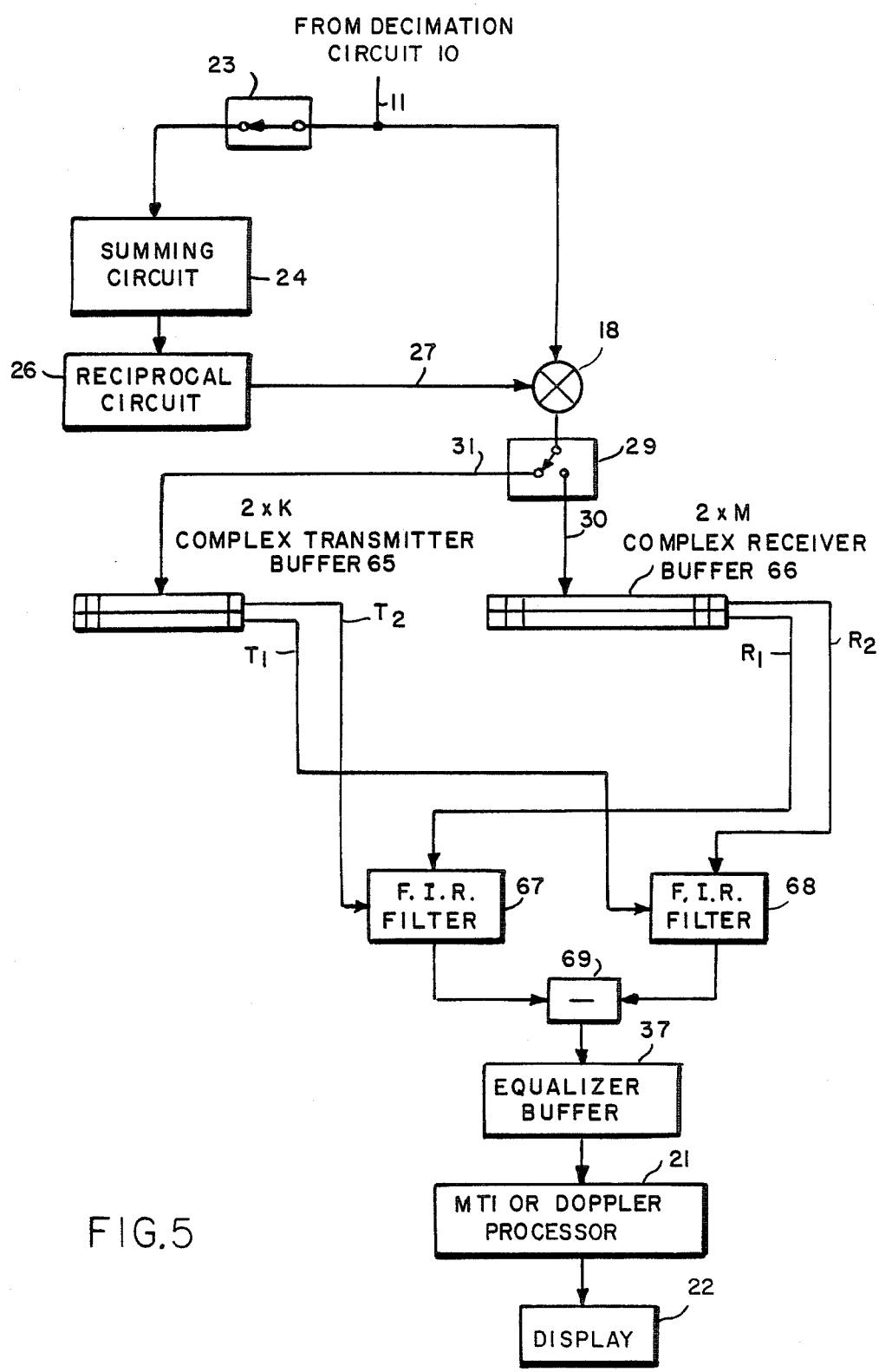
FIG. 5 shows a portion of a receiver system representing an alternative embodiment of the invention depicted in FIG. 2.

A modification of the approach discussed with reference to FIG. 2 is shown in FIG. 5 in which extremely effective, i.e, near perfect, cancellation of absolutely stationary clutter can be achieved in spite of severe pulse-to-pulse variations in the transmitted waveform. Rather than averaging all of the $N \times K$ transmitted signals and using such averaging process to obtaining appropriate filter coefficients as discussed above, the technique of FIG. 5 operates on successive sets of two time-consecutive transmitted pulse samples at a time, supplying them as filter coefficients to finite impulse response filters to which successive sets of two time-consecutive returned pulse samples are supplied at a time. The outputs of the filters are subtracted and the result is stored in a buffer. Such operation can be explained in detail with reference to FIG. 5.

In such figure, during the transmit mode, for example, a first set of two time-consecutive transmitted pulse samples (e.g., $T_1$ and $T_2$) are stored, via switch 29, in a $2 \times K$ complex transmitter buffer 65. During the receiver mode, for example, the first set of two time-consecutive receiver returned echo pulse samples (e.g., $R_1$ and $R_2$) associated therewith are stored in a $2 \times M$ complex receiver buffer 66. The receiver pulses are each supplied to finite impulse response (FIR) filters 67 and 68, respectively, the filter coefficients of which are represented by the transmitter pulses in the sense that the filter coefficients for filter 67 to which $R_1$ is applied are the samples of transmitter pulse $T_2$ while the filter coefficients for filter 68 to which $R_2$ is applied are the samples of transmitter pulse $T_1$. Such operations in effect are convolution operations, the first tramsmitter pulse samples $T_1$ being convolved with the second receiver pulse $R_2$ and the second transmitter pulse samples $T_2$ being convolved with the first receiver pulse $R_1$. The convolved outputs of filters 67 and 68 are subtracted from each other at difference circuit 69 and the result supplied to equalizer buffer 37 which in this case is an $(N-1) \times M$ buffer.

A similar process occurs with respect to the next successive overlapping transmitter pulse samples $T_2$ and $T_3$ and the next set of overlapping receiver pulse samples $R_2$ and $R_3$, the process being repeated for each successive overlapping sets of pairs of pulses (i.e., $T_3$ and $T_4$, $R_3$ and $R_4$; $T_4$ and $T_5$, $R_4$ and $R_5$; etc.), the last pair so processed being $T_{(N-1)}$, $T_N$ and $R_{(N-1)}$, $R_N$.

Thus, in each case the kth transmitter pulse is convolved with the (k+1)st receiver pulse and the (k+1)st transmitter pulse is convolved with the kth receiver pulse.

As also discussed more specifically in the mathematics set forth in Appendix A, for each such pair of convolved transmitter/receiver pulse combinations the non-moving clutter component vanishes and no residual clutter component is present due to imperfect equalization or compensation processing.

In effect perfect cancellation of stationary clutter can be obtained using the approach discussed with reference to FIG. 5, and thus for such stationary clutter the circuitry of FIG. 5 will perform better than the more general circuit of FIG. 2. Clutter echos that exhibit significant fluctuations due to the rotation of the radar antenna between pulses will not receive complete cancellation by the circuit of FIG. 5 and may be cancelled better in a Doppler bank processor by the more general circuit of FIG. 2. A trade-off between clutter cancellation at zero velocity and clutter cancellation at non-zero velocity must be taken into account when choosing one technique or the other.

It is helpful to understand that the technique of FIG. 5 is, for each pair of pulse combinations, effectively the same as that for FIG. 2. Thus, if the samples of two consecutive transmitted pulses are $T_{n-1}(k)$ for $k=1$ to K and $T_n(k)$ for $k=1$ to K, the pairwise average of the samples of the two pulses is $$T_{av}(k) = \tfrac{1}{2} T_{n-1}(k) + \tfrac{1}{2} T_n(k)$$

and the circuit of FIG. 2, for the special case of N=2, calculates filter coefficients $H_{n-1}(k)$ for $k=1$ to K and $H_n(k)$ for K=1 to K with values given by $$\begin{aligned} H_{n-1}(k) &= 2T_{av}(k) - T_{n-1}(k) \\ &= T_n(k) \end{aligned}$$

and $$\begin{aligned} H_n(k) &= 2T_{av}(k) - T_n(k) \\ &= T_{n-1}(k), \end{aligned}$$

and these filter coefficients are the same as those applied to the corresponding received signals by the circuit of FIG. 5.

The signal processing system of the type shown in FIG. 5 can be used in cascade with the signal processing system of the type shown in FIG. 2. In such case, using the general configuration of FIG. 4, the first stage 55 includes the system of FIG. 2 as discussed previously with reference to the description of the operation of FIG. 4 while the second stage 60 includes the system of FIG. for providing the output returned pulse signals for supply to appropriate MTI or Doppler processor circuitry. Such cascaded processing system also can provide further reduction of the distortions in the received returned pulse signals than when using either of the systems of FIG. 2 or 5 alone.

While the systems discussed above are particularly useful when used for radar systems in which the transmitter pulse source is a magnetron, they are also useful for other systems, such as sonar systems, and for other transmitter sources such as klytrons, solid-state transmitter sources or acoustic transmitter sources. Hence the invention is not to be construed as limited to the specific embodiments discussed above except as defined by the appended claims.

APPENDIX A

The description of the operation of the invention is based on the complex envelope of the transmitter and receiver signals, referred to an arbitrary intermediate frequency used by the receiver.

A typical MTI radar transmits pulses $p_n(t-nT_0)$ where $T_0$ is the pulse repetition period. These pulses are of approximate duration T. The pules typically exhibit small variations in their phase and amplitude characteristics so that, in general, $p_n(t) \neq p_{n+1}(t)$. The received signal $r_n$ during the nth repetition interval due to a target or scatterer at time delay D can be modeled as $$r_n(t-nT_0) = Ae^{jn\Delta}p_n(t-nT_0-D), \tag{1}$$

where A is the complex reflection coefficient, modified by the round-trip path attenuation, and $\Delta$ is a pulse-to-pulse phase change resulting from pulse-to-pulse motion of the reflecting target.

A moving-target or Doppler processor looking for targets at a time delay $D'$ uses signals from N consecutive pulse repetition intervals and exploits the variations due to $\Delta$ in order to discriminate between moving ($\Delta \neq 0$) and stationary ($\Delta = 0$) targets, or between targets moving at different velocities. The value of N may be as small as 2 in a 2-pulse clutter canceller, or it may be very large (up to 64, for example) in a Doppler bank processor.

The moving target calculation at time delay $D'$ and phase progression $\Delta'$ typically consists of forming a sum $$v(\Delta', D') = \sum_{n=1}^{N} C_n w_n(\Delta') r_n(D') \qquad (2)$$

where the coefficients $\{C_n\}$ compensate for the average phase shifts of the transmitted pulses, and possibly for their average amplitudes, and the coefficients $w_n(\Delta')$ are chosen to enhance target response with Doppler shifts that have progression values $\Delta'$ and reduce the response to targets with other values of $\Delta$. Since a primary source of interference to radar operations is ground clutter and reflections from stationary objects with $\Delta = 0$, the coefficients $w_n$ for moving targets are usually chosen so that $$\sum_{n=1}^{N} w_n(\Delta') \approx 0. \qquad (3)$$

When a reflecting object yielding the signal described by (1) is present, the output voltage $v$ of (2) is given by $$v(\Delta', D') = A \sum_{n=1}^{N} C_n w_n(\Delta') e^{jn\Delta} p_n(D' - D). \qquad (4)$$

If the voltage arises from a stationary clutter source, then $\Delta = 0$, and the response is $$v(\Delta', D') = A \sum_{n=1}^{N} C_n w_n(\Delta') p_n(D' - D). \qquad (5)$$

If all of the pulses involved in the processing are perfectly matched so that $$C_n p_n(t) = C_1 p_1(t) \text{ for all } n$$

then Eq. (5) becomes $$v = A z_0(D' - D) \sum_{n=1}^{N} w_n(\Delta'),$$

where $z_0$ is $C_1 p_1$ and by virtue of Eq. (3)

$$v \approx 0.$$

However, because of small pulse-to-pulse imperfections of the radar, the actual situation is that if $$z_n(t) = C_n p_n(t) \qquad (6)$$

and $$z_{ave}(t) = \frac{1}{N} \sum_{n=1}^{N} z_n(t), \qquad (7)$$

and if the small error fluctuations, $e_n(t)$ are defined by $$e_n(t) = z_n(t) - z_{ave}(t), \qquad (8)$$

then the output $v$ is actually $$\begin{aligned} v &= A \sum_{n=1}^{N} w_n(\Delta')[z_{ave}(D' - D) + e_n(D' - D)] \\ &\approx A \sum_{n=1}^{N} w_n(\Delta') e_n(D' - D). \end{aligned} \qquad (9)$$

The small error fluctuations $\{e_n(t)\}$ thus result in a leak-through of the stationary clutter return and contaminate the processing. If the pulse-to-pulse variations only represent two percent of the average pulse shape, for example, the resulting leakage is then of the order of 34 dB below the peak signal, and the clutter suppression is therefore limited to not much more than 34 dB. It is therefore desirable to make $e_n(t)$ as close as possible to zero for all values of t.

The desired objective can be accomplished by suitable equalization of the received pulses using the processing in the invention described with reference to FIG. 2. A first key step in such processing is the calculation of gain correction factors by computing $B_n$, such that $$B_n = \int p_n(t) dt \qquad (10)$$

over the duration of the transmitted pulse. In an initial step of the receiver processing, the received signal $r_n(t)$ is then replaced by the signal $s_n(t)$, where $$s_n(t) = r_n(t)/B_n. \qquad (11)$$

By substitution of Eq. (11) into Eq. (1):

$$s_n(t) = A e^{jn\Delta} q_n(t - D) \qquad (12)$$

where $$q_n(t) = p_n(t)/B_n. \qquad (13)$$

If $P_n(f)$ is the spectrum in the frequency domain of $p_n(t)$ in the time domain, $$P_n(f) = \int e^{-j2\pi ft} p_n(t) dt, \qquad (14)$$

then $$B_n = P_n(0). \qquad (15)$$

If $Q_n(f)$ is the spectrum in the frequency domain of $q_n(t)$ then $$Q_n(f) = p_n(f)/B = P_n(f)/P_n(0) \qquad (16)$$

and therefore $$Q_n(0) = 1 \text{ for all } n. \qquad (17)$$

The next key step in the processing is the calculation of equalization filters for the modified pulses $\{q_n(t)\}$. Let $$q_{ave}(t) = \frac{1}{N} \sum_{n=1}^{N} q_n(t), \qquad (18)$$

and define the equalizing filter coefficient function $p_n(t)$ as $$h_n(t) = 2q_{ave}(t) - q_n(t). \qquad (19)$$

It will be useful to express the perturbations of the pulses about the average by letting $$\epsilon_n(t) = q_n(t) - q_{ave}(t). \qquad (20)$$

The pulses can then be rewritten as $$q_n(t) = q_{ave}(t) + \epsilon_n(t) \qquad (21)$$

and the equalizing filter coefficient signal can be written as $$h_n(t) = q_{ave}(t) - \epsilon_n(t). \qquad (22)$$

In the frequency domain, the corresponding relations are $$Q_n(f) = Q_{ave}(f) + E_n(f) \qquad (23)$$

for the individual pulses, and $$H_n(f) = Q_{ave}(f) - E_n(f) \qquad (24)$$

for the equalizing filters' transfer functions.

The next key step in the processing is to use the equalizing filter to calculate a further modified received signal $z_n(t)$ $$z_n(t) = \int d\tau h_n(\tau) s_n(t-\tau) \qquad (25)$$

by passing the modified received signal for each pulse through the equalizing filter selected for it. By reference to Eq. (12), this has the effect of making $$z_n(t) = A e^{jn\Delta} u_n(t) \qquad (26)$$

where $$u_n(t) = \int d\tau h_n(\tau) q_n(t-\tau). \qquad (27)$$

Correspondingly, in the frequency domain, $$U_n(f) = H_n(f) Q_n(f), \qquad (28)$$

or upon substituting Eqs. (23) and (24) into Eq. (28), $$U_n(f) = [Q_{ave}(f) - E_n(f)][Q_{ave}(f) + E_n(f)] \qquad (29)$$

or $$U_n(f) = [Q_{ave}(f)]^2 - [E_n(f)]^2. \qquad (30)$$

After equalization, the remainder of the processing can be performed much as in the conventional moving target processor of Eq. (2), by calculating $$v(\Delta', D') = \sum_{n=1}^{N} w_n(\Delta') u_n(D'). \qquad (31)$$

On substitution of Eq. (26) into Eq. (31), the response is then $$v = A \sum_{n=1}^{N} w_n(\Delta') e^{jn\Delta} u_n(D' - D), \qquad (32)$$

or, in the special case of interest where $\Delta = 0$ for stationary clutter, $$v = A \sum_{n=1}^{N} w_n(\Delta') u_n(D' - D). \qquad (33)$$

The value of $v$ can be expressed as a Fourier transform of the spectrum by writing it as $$v = A \sum_{n=1}^{N} w_n(\Delta') \int df e^{j2\pi f(D'-D)} U_n(f) \qquad (34)$$

or $$v = \int df e^{j2\pi f(D'-D)} V(f) \qquad (35)$$

where $$V(f) = A \sum_{n=1}^{N} w_n(\Delta') U_n(f). \qquad (36)$$

Upon substituting the value of $U_n(f)$ from Eq. (30), $$V(f) = A \sum_{n=1}^{N} w_n(\Delta')[Q_{ave}(f)]^2 - A \sum_{n=1}^{N} w_n(\Delta')[E_n(f)]^2 \qquad (37)$$

The first sum in Eq. (37) vanishes, by virtue of Eq. (13), so that $$V(f) = -A \sum_{n=1}^{N} w_n(\Delta')[E_n(f)]^2. \qquad (38)$$

It can be seen that small percentage variations of the original pulse spectra are effectively squared by the equalizer, so that 1% errors, for example, are reduced to 0.01% errors.

In using the equalization technique of the invention, it should be noted that since $E_n(0) = 0$ for all $n$, the spectral error will be smallest at the center of the band. Furthermore, because it is in general difficult to achieve good equalization near the nulls of the original spectra $Q_n(f)$, it is desirable to pass all of the signals through fixed lowpass complex filters that restrict the matching problem to small values of $f$ where the best possible match can be achieved.

It is important to note that the invention also permits good suppression of clutter whose velocity is small but not zero. When $\Delta$ is not zero, Eq. (37) can be rewritten as $$V(f) = A \sum_{n=1}^{N} w_n(\Delta') e^{jn\Delta}[Q_{ave}(f)]^2 - A \sum_{n=1}^{N} w_n(\Delta') e^{jn\Delta}[E_n(f)]^2, \qquad (39)$$

and the magnitude of the spectrum of the clutter leakthrough is bounded above by the inequality $$|V(f)| < |A||Q_{ave}(f)|^2 \left| \sum_{n=1}^{N} w_n(\Delta') e^{jn\Delta} \right| + \tag{40}$$

$$|A| \left( \underset{1 < n < N}{\text{Maximum }} [E_n(f)]^2 \right) \sum_{n=1}^{N} |w_n(\Delta')|.$$

The first component of the bound in Eq. (40) is small by virtue of careful choice of the values of the coefficients $w_n(\Delta')$ so that $\Sigma w_n(\Delta')e^{jn\Delta}$ is small, and the second term is small because the aforementioned squaring off the error term $E_n(f)$ squares the largest error fraction.

The device described in FIG. 5 achieves its improvement in a manner which for $N=2$ is very similar to that of the device of FIG. 2, as described above, but whose performance is somewhat different for $N>2$. This device produces pairwise equalized pulses by forming $$z_n(t) = \int d\tau q_{n-1}(\tau) s_n(t-\tau) - \int d\tau q_n(\tau) s_{n-1}(t-\tau) \tag{41}$$

for $n>2$, which makes $z_n(t)$ have the frequency spectrum $$Z_n(f) = Q_{n-1}(f) S_n(f) - Q_n(f) S_{n-1}(f). \tag{42}$$

Substituting the relation $$S_n(f) = A e^{jn\Delta} Q_n(f)$$

into Eq. (42), $Z_n(f)$ can be expressed as $$Z_n(f) = A Q_{n-1}(f) Q_n(f) [e^{jn\Delta} - e^{j(n-1)\Delta}]. \tag{43}$$

When the pairwise-equalized pulses are processed by a Doppler bank processor, the frequency spectrum of the resultant time series is $$V(f) = \sum_{n=2}^{N} w_n(\Delta') Z_n(f). \tag{44}$$

The first term in the sum is missing because equalized pulse returns are not available until after the second echo return. Substituting Eqs. (43) in (44), $V(f)$ is given by $$V(f) = A \sum_{n=2}^{N} w_n(\Delta') Q_{n-1}(f) Q_n(f) e^{jn\Delta} (e^{j\Delta} - 1). \tag{45}$$

It can readily be seen that when $\Delta$ is 0, $V(f)$ is exactly 0 because $e^{j\Delta} = 1$ is zero. Thus, stationary clutter is perfectly suppressed by this equalization device. When the clutter is moving slowly, (or appears to be moving slowly), there is a residual uncancelled component. The size of this component can be estimated by a procedure analagous to that used in deriving the above formulae applicable to the device described by FIG. 2. Letting $G_n(f)$ denote the product of $Q_{n-1}$ and $Q_n$, $$G_n(f) = Q_{n-1}(f) G_n(f), \tag{46}$$

and letting $$G_{av}(f) = \frac{1}{N-1} \sum_{n=2}^{N} G_n(f), \tag{47}$$

and $$\Gamma_n(f) = G_n(f) - G_{av}(f), \tag{48}$$

the value of $V(f)$ of Eq. (45) can be written as $$V(f) = A \sum_{n=2}^{N} w_n(\Delta') G_{av}(f) e^{jn\Delta} (e^{j\Delta} - 1) + \tag{49}$$

$$A \sum_{n=2}^{N} w_n(\Delta') \Gamma_n(f) e^{jn\Delta} (e^{j\Delta} - 1).$$

The first of these summations can be made very small by suitable choice of the Doppler bank coefficients $w_n(\Delta')$. The second summation, however, has a size which is proportional to $$|e^{j\Delta} - 1| \underset{2 \leq n \leq N}{\text{Max}} |\Gamma_n(f)|.$$

In cases where $\Delta$ is sufficiently small this term will be small enough so that the device of FIG. 5 performs better than the device of FIG. 2. In other cases, such as where high antenna rotation rates used, the more complicated device of FIG. 2 is preferable.

Figure 4:
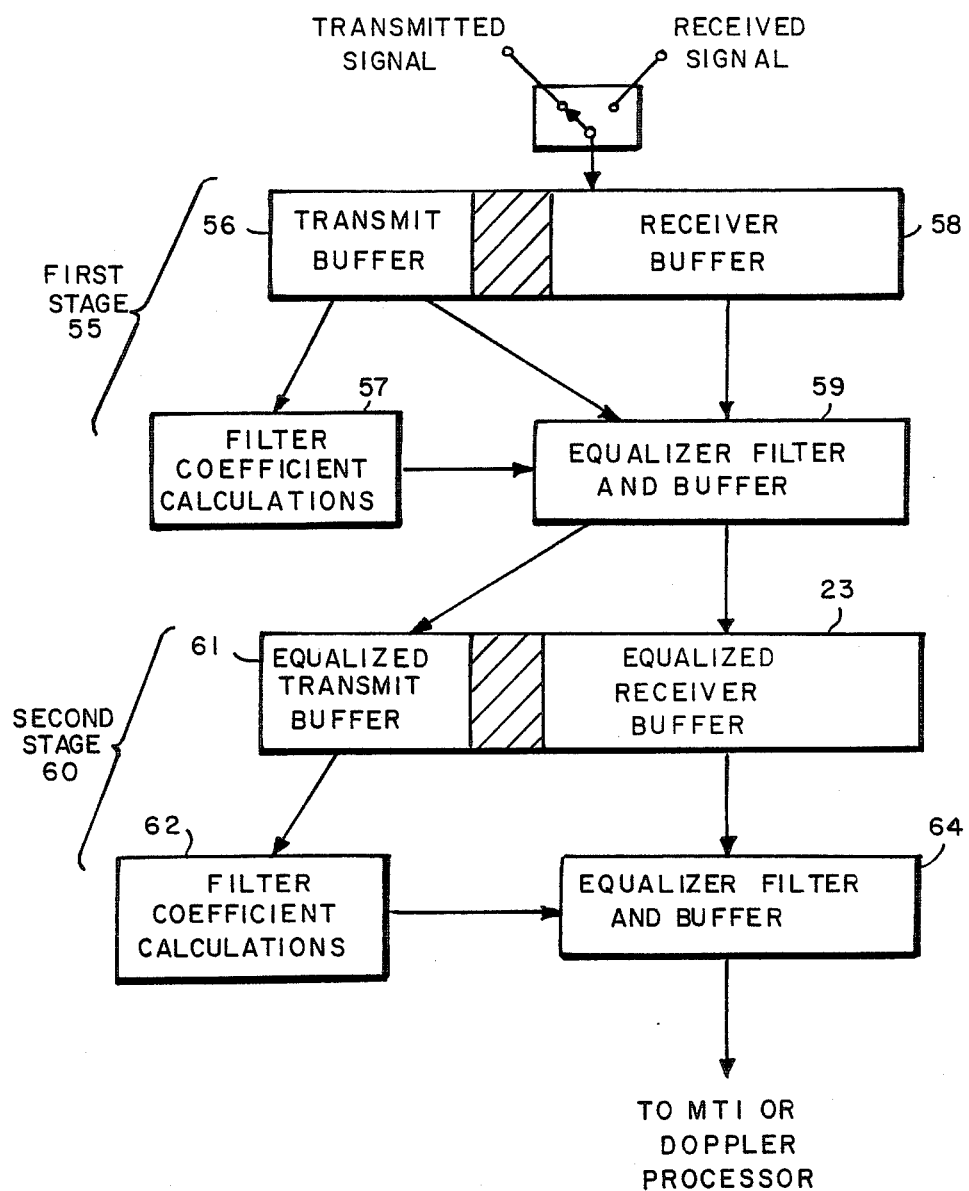
FIG. 4 shows a block diagram of an overall receiver system using cascaded stages of the receiver system shown in FIG. 2.

It is possible to obtain the improvements of both types of circuit with a cascade of the type shown in FIG. 4, by passing each pairwise-equalized received echo sequence through another filter whose coefficients are $g_{av}(t) - \gamma_n(t)$, where $g_{av}$ and $\gamma_n$ are the time-domain equivalents of the spectra $G_{av}(f)$ and $\Gamma_n(f)$ respectively.

What is claimed is:

1. A signal processing system for use in a transmitter/receiver system, the transmitter of which includes a transmitter pulse source for providing transmitted pulse signals that may have undesired amplitude, frequency or phase distortions which vary from transmitter pulse to transmitter pulse, and the receiver of which receives returned pulse signals which include said distortions, said receiver including:
   digitizing means responsive to said transmitted and to said returned pulse signals for providing a sequence of complex digitized samples of said transmitted and returned pulse signals having in-phase and quadrature components thereof;
   averaging means responsive to a plurality of sequential transmitted pulse signals, each comprising a plurality of complex digitized samples thereof, for providing an average signal representing the average of said sequential pulse signals;
   means responsive to said average signal and to said sequence of complex digitized samples of said plurality of sequential transmitted pulse signals for determining a plurality of filter coefficients for use with the returned pulse signal samples corresponding to said transmitted pulse signal samples;
   filter means responsive to a plurality of sequential returned pulse signals, each comprising a plurality of complex digitized samples thereof, and to said plurality of corresponding filter coefficients for providing returned output signals in which said distortions are reduced.

2. A signal processing system in accordance with claim 1 wherein said averaging means responds to n sequential transmitted pulse signals each comprising k complex digitized samples thereof and said filter means comprises n filters responsive to n sequential returned pulse signals each comprising m complex digitized samples thereof and to k filter coefficients.

3. A signal processing system in accordance with claim 2 wherein said filter coefficient determining means includes processing means for determining n complex filter coefficients, $h_n(t)$ in accordance with the following expression:

$$h_n(t) = 2q_{ave}(t) - q_n(t)$$

where $q_{ave}(t)$ is the kth complex sample of the average transmitted pulse signal and $q_n(t)$ is the kth complex sample of the nth transmitted pulse signal.

4. A signal processing system in accordance with claim 1 and further including means responsive to said digitizing means for multiplying the complex digitized samples of said transmitted pulse signals and of said returned pulse signals by a scale factor.

5. A signal processing system in accordance with claim 4 wherein said multiplying means includes:
   summation means responsive to the complex digitized samples of a transmitted pulse signal for providing the complex sum of said samples;
   reciprocating means responsive to said complex sum for providing a complex scale factor which is the reciprocal of said complex sum; and
   multiplier means for multiplying said transmitted pulse signals and said returned pulse signals by said complex scale factor.

6. A signal processing circuit in accordance with claim 1 wherein said filter means comprise finite impulse response filters.

7. A signal processing system in accordance with claim 1 wherein said digitizing means includes:
   a digitizing circuit for providing complex digitized samples of said transmitted pulse signals and said returned pulse signals at a first selected sampling rate;
   digital filter means responsive to said digitizing circuit for reducing the bandwidth of said complex digitized samples; and
   decimation circuit means for reducing the first selected sampling rate to a second selected sampling rate.

8. A signal processing system in accordance with claim 7 wherein said digital filter means is a low-pass filter having a stopband attenuation characteristic of more than about 40 dB within the stopband thereof.

9. A signal processing system in accordance with claim 1 wherein said digitizing means includes:
   a digitizing circuit for providing complex digitized samples of said transmittal pulse signals and said returned pulse signals at a first selected sampling rate;
   first digital filter means responsive to said digitizing circuit for reducing the bandwidth of said complex digitized samples;
   first decimation circuit means for reducing the first selected sampling rate to a second selected sampling rate;
   second digital filter means for further reducing the bandwidth of said complex digital samples; and
   second decimation circuit means for further reducing said second selected sampling rate to a third selected sampling rate.

10. A signal processing system in accordance with claim 9 wherein said first selected sampling rate is two to four times said second selected sampling rate.

11. A signal processing system in accordance with claim 1 and further including:
    phase increment estimation circuit means responsive to a block of n transmitted pulse signals for estimating the average sample-to-sample phase increments of said n transmitted pulse signals;
    means responsive to said estimated average phase increments and to a successive block of n transmitted pulse signals or to a successive block of n returned pulse signals, respectively, for correcting the average phase increment of said successive block of n transmitted pulse signals or the average phase increment of said successive block of n returned pulse signals, respectively.

12. A signal processing system in accordance with claim 11 wherein said phase increment estimation circuit means includes:
    means for determining the phase changes from sample to sample of a plurality of complex digitized samples of said block of transmitted pulse signals; and
    phase averaging means responsive to said phase changes for providing said estimated average phase increments.

13. A cascaded signal processing system comprising a pair of cascaded stages, each of said cascaded stages including a signal processing system in accordance with claim 1 and further wherein the returned output signals from a first one of said cascaded stages are supplied to the filter means of the second one of said cascaded stages are the sequential returned pulse signals therefor and said first one of said cascaded stages includes further filter means responsive to said plurality of sequential transmitted pulse signals and to said filter coefficients for providing filtered transmitted pulse signals which are supplied as the sequential transmitted pulse signals for the second one of said cascaded stages.

14. A signal processing system in accordance with claim 1 wherein said transmitter/receiver system is a radar system and said transmitter pulse source is a magnetron.

15. A signal processing system in accordance with claim 1 wherein said transmitter/receiver system is a radar system and said transmitter pulse source is a klystron.

16. A signal processing system in accordance with claim 1 wherein said transmitter/receiver system is a radar system and said transmitter pulse source is a solid-state transmitter source.

17. A signal processing system in accordance with claim 1 wherein said transmitter/receiver system is a sonar system and said transmitter pulse source is an acoustic transmitter source.

18. A signal processing system for use in a transmitter/receiver system, the transmitter of which includes a transmitter pulse source for providing transmitted pulse signals which may have undesired amplitude, frequency or phase distortions which vary from transmitter pulse to transmitter pulse, and the receiver of which receives returned pulse signals which include said distortions, said receiver including:
    digitizing means responsive to said transmitted and to said returned pulse signals for providing two successive sets of complex digitized samples of said transmitted and returned pulse signals having in-phase and quadrature components thereof;
    means responsive to said two successive sets of complex digitized samples of said transmitted pulse signals for providing two successive sets of filter coefficients;

a first filter means responsive to the first set of said two successive sets of filter coefficients and to the second set of said two successive sets of complex digitized samples of said returned pulse signals for providing a first convolution signal therefrom;

a second filter means responsive to the second set of said two successive sets of filter coefficients and to the first set of said two successive sets of complex digitized samples of said of said returned pulse signals for providing a second convolution signal therefrom;

means responsive to said first and second convolution signals for providing a returned output signal in which said distortions are reduced.

19. A signal processing signal in accordance with claim 18 wherein said returned output signals providing means includes subtraction means for providing said returned output signal which is the difference between said first and second convolution signals.

20. A signal processing system in accordance with claim 18 wherein said first and second filter means are each finite impulse response filters.

21. A cascaded signal processing system comprising a pair of cascaded stages, a first one of said cascaded stages including a signal processing system in accordance with claim 18 and a second one of said cascaded stages including a signal processing system in accordance with claim 1 and further wherein the returned output signals from said first one of said cascaded stages are supplied as the returned pulse signals for said second one of said cascaded stages and said first one of said cascaded stages further includes further filter means responsive to said plurality of sequential transmitted pulse signals and to said filter coefficients for providing filtered transmitted pulse signals which are supplied as the transmitted pulse signals for said second one of said cascaded stages.

* * * * *